(12) United States Patent
Yamaguchi et al.

(10) Patent No.: US 7,484,361 B2
(45) Date of Patent: Feb. 3, 2009

(54) EXHAUST GAS PURIFYING APPARATUS OF MOTORCYCLE

(75) Inventors: Takashi Yamaguchi, Saitama (JP); Akinori Hirano, Saitama (JP); Takanori Sato, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 225 days.

(21) Appl. No.: 11/159,309

(22) Filed: Jun. 23, 2005

(65) Prior Publication Data
US 2005/0284141 A1 Dec. 29, 2005

(30) Foreign Application Priority Data
Jun. 24, 2004 (JP) .................... 2004-186418

(51) Int. Cl.
*F02B 27/02* (2006.01)
(52) U.S. Cl. .................... 60/312; 60/299
(58) Field of Classification Search .......... 60/299, 60/312, 324; 422/179–181
See application file for complete search history.

(56) References Cited

U.S. PATENT DOCUMENTS

| | | | | |
|---|---|---|---|---|
| 3,692,497 A | * | 9/1972 | Keith et al. | 422/179 |
| 4,154,058 A | * | 5/1979 | Mase et al. | 60/293 |
| 4,207,661 A | * | 6/1980 | Mase et al. | 29/890 |
| 4,413,392 A | * | 11/1983 | Otani et al. | 29/890 |
| 4,437,306 A | * | 3/1984 | Ikenoya et al. | 60/293 |
| 4,581,206 A | * | 4/1986 | Otani et al. | 422/171 |
| 5,176,111 A | | 1/1993 | Nakamura et al. | |
| 5,205,244 A | * | 4/1993 | Nakamura et al. | 123/58.1 |
| 5,983,631 A | * | 11/1999 | Mineo | 60/299 |
| 6,250,076 B1 | | 6/2001 | Kawamata et al. | |
| 2003/0079926 A1 | | 5/2003 | Taniguchi et al. | |

FOREIGN PATENT DOCUMENTS

| | | |
|---|---|---|
| EP | 0 411 561 A1 | 2/1991 |
| JP | 56-12694 B2 | 3/1981 |
| JP | 56-50092 B2 | 11/1981 |
| JP | 11-006426 * | 6/1997 |
| JP | 2001-073759 * | 3/2001 |
| WO | WO-97/35099 A1 | 9/1997 |

* cited by examiner

*Primary Examiner*—Thomas E Denion
*Assistant Examiner*—Diem Tran
(74) *Attorney, Agent, or Firm*—Birch, Stewart, Kolasch & Birch, LLP

(57) ABSTRACT

An exhaust gas purifying apparatus is provided for a motorcycle, configured to minimize engine output characteristics, and to raise the temperature of a catalyst to an activation temperature rapidly after a start of the engine, while not increasing a vehicle body size. The motorcycle includes an engine in which a cylinder block is extended upward on a crankcase. An exhaust port is provided on a front portion of the engine; an exhaust pipe extends forward of the engine from the exhaust port, then extends downward once, and thereafter, extends toward the rear of a vehicle body. A catalyst is placed in the exhaust pipe. The exhaust pipe passes along a side of the cylinder block, and the catalyst is placed in the exhaust pipe in a position located on the side of the cylinder block.

24 Claims, 5 Drawing Sheets

EXHAUST GAS PURIFYING APPARATUS OF MOTORCYCLE

CROSS-REFERENCE TO RELATED APPLICATION

The present application claims priority under 35 U.S.C. §119 to Japanese Patent Application No. 2004-186418, filed Jun. 24, 2004, the entire contents of which are hereby incorporated by reference.

BACKGROUND OF THE INVENTION

1. Field of the Invention

The present invention relates to an exhaust gas purifying apparatus of a motorcycle, in which an exhaust pipe is allowed to pass along a side of an engine, a catalyst is placed in the exhaust pipe, and exhaust gas is purified.

2. Description of Background Art

Heretofore, an exhaust gas purifying apparatus of a motorcycle has been known, in which a catalyst is placed in an exhaust pipe, exhaust gas is passed through the catalyst, and the exhaust gas is purified. For example, refer to Japanese Patent Publication No. S56 (1981)-50092 (FIG. 1) and Japanese Patent Publication No. S56 (1981)-12694 (FIG. 2).

FIG. 1 of Japanese Patent Publication No. S56 (1981)-50092 is a cross-sectional view of a two-cycle engine.

A two-cycle engine 10 is composed of a crankcase 13 (Reference numeral of the publication concerned is also used here. The same applies to the following.), a body 14 of the engine which includes a block 11, a head 12 and a piston 15 as main components, a combustion chamber 17 provided in an inside of the body 14, a multichannel reactor 26 (hereinafter referred to as a catalyst 26) connected as a catalyst to the combustion chamber 17 through an exhaust passage 25, and an exhaust pipe 29 connected to a rear end of the catalyst 26.

FIG. 2 of Japanese Patent Publication No. S56 (1981)-12694 is a partially cutaway side view of an engine.

An exhaust system is a member composed of an exhaust pipe 8 attached forward and downward from an engine body 1, a silencer 9 connected to a rear end of the exhaust pipe 8, and a catalyst converter 6 (hereinafter, referred to as a catalyst 6) interposed in the way of the exhaust pipe 8.

For this type of catalyst, a temperature range is determined where sufficient performance is ensured. This temperature range is referred to as an activation temperature. Temperature of the catalyst immediately after a start of the engine is lower than the activation temperature. Hence, there has been a problem regarding time required for the temperature of the catalyst to rise and reach the activation temperature.

Accordingly, in Japanese Patent Publication No. S56 (1981)-50092, the catalyst 26 is placed immediately behind the combustion chamber 17, and the temperature of the catalyst 26 is thus attempted to rise to the activation temperature rapidly after the start.

However, when the catalyst 26 is placed immediately behind the combustion chamber 17, resistance of an exhaust gas flow is increased, which is thus prone to affect engine output characteristics.

In order to solve such a problem, in Japanese Patent Publication No. S56 (1981)-12694, the catalyst 6 is interposed in the way of the exhaust pipe 8.

The catalyst 6 placed in front of the engine is placed on the way of the exhaust pipe 8 as well as apart from a combustion chamber. Hence, there is no concern that the temperature of the catalyst 6 rises excessively.

However, the catalyst 6 is placed so as to be apart from the combustion chamber of the engine, and accordingly, it is difficult to allow the catalyst 6 to reach the activation temperature rapidly.

In addition, the catalyst 6 is placed in front of the engine, and therefore it is necessary to take measures to shift a front wheel forward so as to prevent the catalyst 6 from interfering with the front wheel or a fender attached around the front wheel. However, when the measures are taken, a vehicle body is increased in size. Moreover, if a heat insulating member is provided, then the number of parts is increased, leading to a weight increase and a cost increase.

SUMMARY AND OBJECTS OF THE INVENTION

In this connection, it is an object of the present invention to provide an exhaust gas purifying apparatus of a motorcycle, in which it is less prone to affect the engine output characteristics, the temperature of the catalyst is raised to the activation temperature rapidly after the start of the engine, and the vehicle body is not increased in size.

According to a first aspect of the invention, a motorcycle includes an engine in which a cylinder block extends upward on a crankcase. An exhaust port is provided on a front portion of the engine; the exhaust pipe extending forward of the engine from the exhaust port, then extending downward once, and thereafter, extending toward the rear of a vehicle body. A catalyst is placed in the exhaust pipe, and the exhaust pipe is allowed to pass along a side of the cylinder block. The catalyst is placed in the exhaust pipe in a position located adjacently to the side of the cylinder block.

According to a second aspect of the invention, a portion of the exhaust pipe on the side of the cylinder block is placed within an overall width of the crankcase.

According to a third aspect of the invention, at least two of the catalysts are placed in series in the exhaust pipe, and the catalysts are attached into the exhaust pipe with stay members interposed therebetween.

According to a fourth aspect of the invention, a pair of the stay members onto which each of the catalysts is attached are provided on an approximate center of the catalyst, and the catalyst is provided to set a front end and rear end thereof free.

According to a fifth aspect of the invention, two of the exhaust pipes extend from the engine, and the catalysts are provided in the exhaust pipes connected independently of each other to left and right silencers above a rear wheel.

With the first aspect of the invention, the catalyst placed in the exhaust pipe in a position that is located adjacently to the side of the cylinder block. Accordingly, heat radiation from the exhaust pipe can be reduced owing to heat radiation from the cylinder block.

As a result, there is an advantage in that the temperature of the catalyst can be raised to the activation temperature rapidly after the start of the engine.

In addition, the catalyst is placed near the side of the cylinder block, and accordingly, special care such as heat insulation is not necessary for the respective parts in front of the engine.

As a result, the invention becomes applicable when it is desirable to make the vehicle body compact.

With the second aspect of the invention, the portion of the exhaust pipe on the side of the cylinder block, specifically the portion including the catalyst, can be placed to be close to the cylinder block, and the heat radiation from the exhaust pipe can be further reduced.

As a result, there is an advantage in that the temperature of the catalyst can be raised to the activation temperature far more rapidly after the start of the engine.

In addition, the portion of the exhaust pipe on the side of the cylinder block is placed within the overall width of the crankcase, and accordingly, the portion can be made compact.

As a result, there is an advantage in that an influence thereof on width of the vehicle can be restricted.

With the third aspect of the invention, at least two of the catalysts are placed in series in the exhaust pipe, and accordingly, each catalyst can be miniaturized.

By miniaturizing each catalyst, for example, a catalyst with a simple shape can be attached, even into an exhaust pipe having a bent portion. Therefore, a degree of freedom in placing the exhaust pipe is increased. Moreover, there is an advantage in that an attaching structure of the catalysts can be simplified.

In addition, the catalysts are attached into the exhaust pipe with stay members interposed therebetween, and accordingly, installation work of the catalyst can be performed easily.

Moreover, by miniaturizing each catalyst, the structure of attaching the catalysts into the exhaust pipe is made simple, and accordingly, there is an advantage in that a diameter of the exhaust pipe can be decreased.

With the fourth aspect of the invention, the pair of stay members onto which each of the catalysts is attached is provided on the approximate center of the catalyst, and the catalyst is provided so that the front end and rear end of the catalyst are free. Accordingly, it is not necessary to construct the stay members into a special structure considering influence of thermal expansion of the catalyst. Specifically, there is an advantage in that the structure for attaching the catalysts into the exhaust pipe can be further simplified.

With the fifth aspect of the invention, two exhaust pipes extend from the engine, and the catalysts are provided in the exhaust pipes connected independently of each other to the left and right silencers above the rear wheel.

Accordingly, the catalysts can be easily housed even in exhaust pipes having many bent portions because the catalysts are miniaturized.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A best mode for carrying out the present invention will be described below based on the accompanying drawings. Note that the drawings are assumed to be viewed in directions of reference symbols. Reference symbol U indicates an upward direction, reference symbol D indicates a downward direction, reference symbol F indicates a forward direction, and reference symbol Rr indicates a rearward direction.

Figure 1:
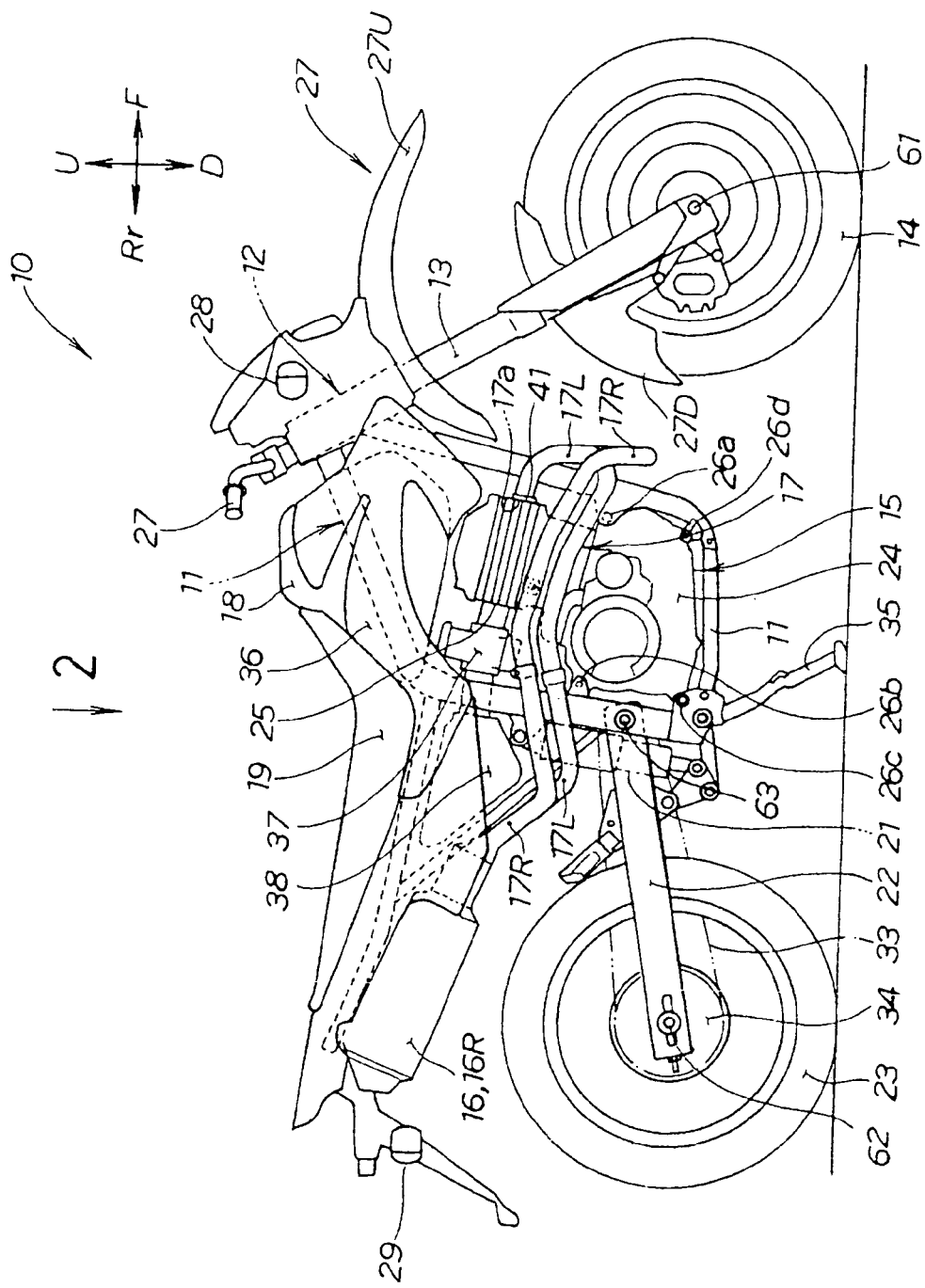
FIG. 1 is a side view of a motorcycle according to the present invention.

FIG. 1 is a side view of a motorcycle according to the present invention. A motorcycle 10 includes a main frame 11, a head pipe 12 formed on a front portion of the main frame 11, front forks 13 steerably attached onto the main frame 11 with the head pipe 12 interposed therebetween, a front wheel 14 attached onto lower portions of the front forks 13 with a front axle 61 interposed therebetween, an engine 15 suspended from the main frame 11, exhaust pipes 17 which flow, to silencers 16, exhaust gas exhausted from the engine 15, a fuel tank 18 and a passenger's seat 19 which are placed from a front of the main frame 11 to a rear thereof, a swing arm 22 attached onto a rear portion of the main frame 11 with a rear cushion 21 interposed therebetween so as to be freely movable vertically while taking a swing arm pivot 63 as a rotation center thereof, and a rear wheel 23 attached onto a rear portion of the swing arm 22 with a rear axle 62 interposed therebetween.

Main components of the engine 15 are formed of a crankcase 24 and a cylinder block 25.

Moreover, the engine 15 is suspended from the main frame 11 with fastening members 26a, 26b, 26c and 26d such as bolts interposed between the crankcase 24 and the main frame 11.

FIG. 1 also shows a carburetor 37, and an air cleaner 38.

With regard to fixing of the exhaust pipes 17 and the silencers 16 connected and integrated with the exhaust pipes 17, inlets 17a of the exhaust pipes 17 are attached onto exhaust ports 41 of the engine 15, and the silencers 16 are partially fixed to the main frame 11 by fastening means, such as bolts.

Also provided are handlebars 27, front direction indicators 28, and rear direction indicators 29.

Between left and right upside-down front forks 13 and 13, fenders 27 are attached in order to restrict the motorcycle 10 and a passenger from being splashed with mud.

Note that the fenders 27 are members composed by being divided, which are formed of: a lower fender 27D attached to be close to the front wheel 14; and an upper fender 27U attached to be apart from the front wheel 14.

With regard to a drive system, a speed reducer (not shown) is provided in a lower portion of the engine 15, and a chain 33 which transmits drive force from the speed reducer to the rear wheel 23 is extended and coupled to a sprocket 34 provided on the rear wheel 23.

By such a drive system, the drive force of the engine 15 is reduced in speed by the speed reducer, transmitted from the speed reducer to the chain 33, and transmitted from the chain 33 to the rear wheel 23 through the sprocket 34 on the rear wheel 23. Also shown in FIG. 1 are a side stand 35 and a cover member 36 which is attached to the fuel tank 18 and the like from the outside.

Figure 2:
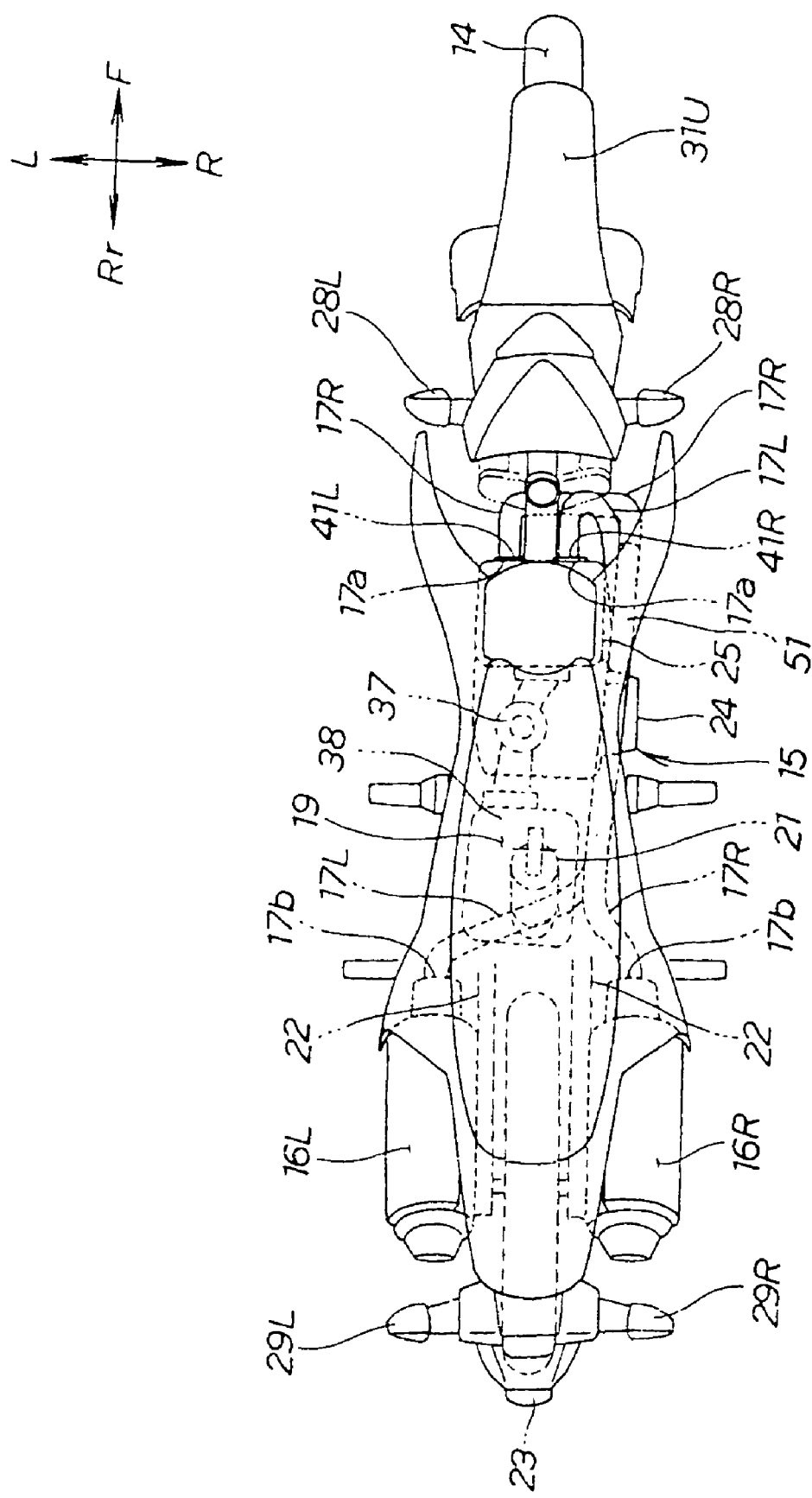
FIG. 2 is a view on Arrow 2 of FIG. 1.

FIG. 2 is a view on Arrow 2 of FIG. 1, showing a plan view of the motorcycle according to the present invention. Seen from the passenger, reference symbol L indicates a left direction, and reference symbol R indicates a right direction.

In this embodiment, the engine 15 is a four-cycle single-cylinder engine. Moreover, the two left and right exhaust ports 41L and 41R are provided on a front portion of the engine 15, and the two exhaust pipes 17L and 17R are attached thereonto.

Specifically, the inlet 17a of the exhaust pipe 17R is connected to the left-side exhaust port 41L. The exhaust pipe 17R is extended forward, extended downward so as to avoid interference with the exhaust pipe 17L, extended in the right direction, and further, extended toward the rear of the vehicle body. Moreover, the silencer 16R is connected to an outlet of the exhaust pipe 17R.

Meanwhile, the inlet 17a of the exhaust pipe 17L is connected to the right-side exhaust port 41R. The exhaust pipe 17L is extended forward, extended downward, extended toward the rear of the vehicle body along below the exhaust pipe 17R, and extended after changing an orientation thereof to the left direction L of the vehicle body in the rear of the engine 15, in front of the rear wheel 23, and below the passenger's seat 19. Moreover, the silencer 16L is connected to an outlet 17b of the exhaust pipe 17L.

The silencers 16L and 16R are members placed to be substantially left-right symmetric with respect to a center line of the vehicle body.

Portions of the exhaust pipes 17L and 17R on a side of the cylinder block 25 are placed within an overall width of the crankcase 24.

Note that reference numerals 28L and 28R denote the front direction indicators, and reference numerals 29L and 29R denote the rear direction indicators.

Figure 3:
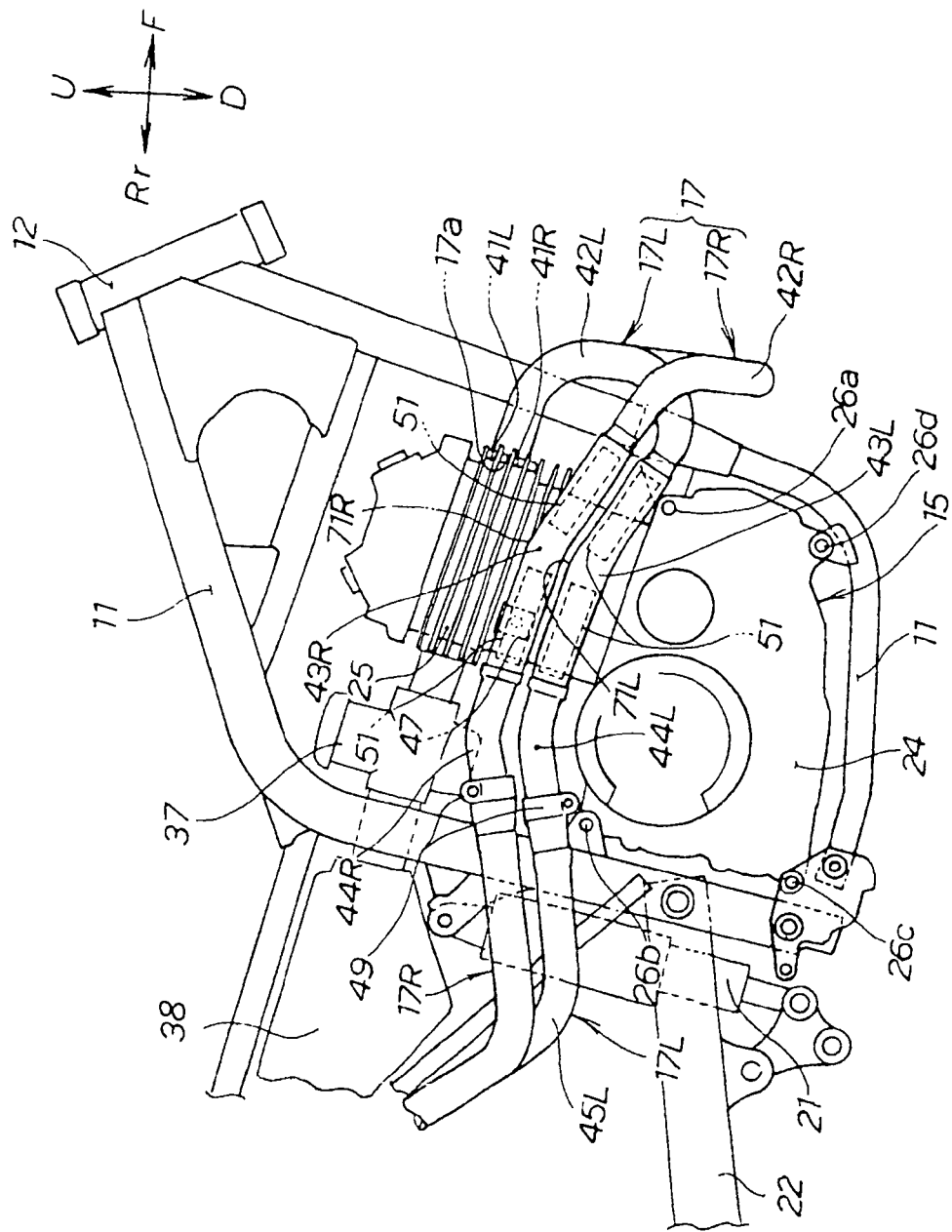
FIG. 3 is a side view of main portions of the motorcycle according to the present invention.

FIG. 3 is a side view of main portions of the motorcycle according to the present invention, explaining that each of the exhaust pipes is formed in a manner that multiple short exhaust pipes are connected to one another, and explaining that catalysts are attached to one or more of the short exhaust pipes.

Specifically, in order to send the exhaust gas from the engine 15 to each silencer 16 (refer to FIG. 1), each exhaust pipe 17 is formed by connecting plural pipes having various curvatures to one another. In such a way, the exhaust pipe 17 avoids the interference with other members until the exhaust pipe 17 reaches the silencer 16.

The right-side exhaust pipe 17R is formed of a first exhaust pipe 42R which has the inlet 17a connected to the left-side exhaust port 41L of the cylinder block 25 and is placed while sequentially changing an orientation thereof forward, downward and rearward, a second exhaust pipe 43R which is connected to an outlet of the first exhaust pipe 42R and placed toward the rear, a third exhaust pipe 44R which has an inlet thereof connected to an outlet of the second exhaust pipe 43R and is oriented toward the rear, and a fourth exhaust pipe 45R which has an inlet thereof connected to an outlet of the third exhaust pipe 44R and is connected to the silencer 16R (refer to FIG. 2).

Moreover, in the exhaust pipe 17R, in an inside of the second exhaust pipe 43R passing along the side of the cylinder block 25, catalysts 51 and 51 are placed in series.

The second exhaust pipe 43R has a bent portion 71R, and the catalysts 51 and 51 are placed in series while sandwiching the bent portion 71R therebetween.

With regard to the left-side exhaust pipe 17L, lengths and curvatures of first to fourth exhaust pipes 42L, 43L, 44L and 45L sometimes differ from those of the right-side exhaust pipe 17R in order to avoid interference with other members. However, others features do not vary much from those of the right-side exhaust pipe 17R, and accordingly, description of the left-side exhaust pipe 17L will be omitted.

Specifically, the motorcycle 10 includes the engine 15 in which the cylinder block 25 extends upward on the crankcase 24. The exhaust ports 41L and 41R are provided on the front portion of the engine 15; the exhaust pipes 17 are formed of the left and right exhaust pipes 17L and 17R which extend forward of the engine 15 from the exhaust ports 41L and 41R, then extend downward once, and thereafter, extend toward the rear of the vehicle body 50. The catalysts 51 placed in the exhaust pipes, and the exhaust pipes 17 are allowed to pass along the side of the cylinder block 25. The catalysts 51 are placed in the exhaust pipes in positions located adjacent to the side of the cylinder block 25.

In the two exhaust pipes 17L and 17R, the second exhaust pipes 43L and 43R are placed in parallel to each other in the vertical direction, and the catalysts 51 and 51 are provided so as to substantially coincide to each other in the vertical direction.

Returning to FIG. 2, the portions on the side of the cylinder block are placed to be close to the cylinder block 25, and accordingly, temperatures of the catalysts 51 can be raised to activation temperature far more rapidly after a start of the engine.

In addition, in the exhaust pipes 17, the portions on the side of the cylinder block are placed within the overall width of the crankcase 24, and accordingly, the portions can be made compact.

As a result, an influence thereof on width of the vehicle can be restricted.

An attaching structure of the catalysts 51, 51, 51 and 51 provided inside the exhaust pipes 17L and 17R will be mainly described below based on FIG. 4 to FIG. 6.

Figure 4:
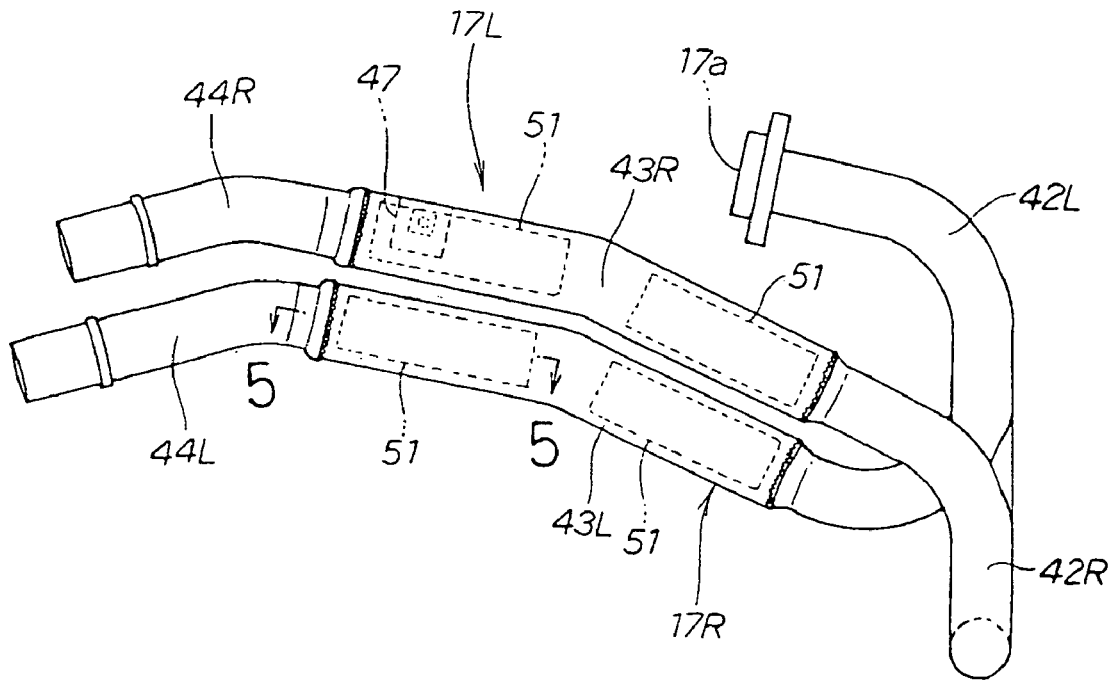
FIG. 4 is a side view of exhaust pipes according to the present invention, into which catalysts are attached.

FIG. 4 is a side view of the exhaust pipes according to the present invention, into which the catalysts are attached.

It is shown that, in the left-side exhaust pipe 17L, the catalysts 51 and 51 are attached into the second exhaust pipe 43L, and the first exhaust pipe 42L, the second exhaust pipe 43L and the third exhaust pipe 44L are connected to one another in this order. After being connected, the first exhaust pipe 42L and the second exhaust pipe 43L are fixed together by welding over the entire circumference of a connected portion thereof. In a similar way, the second exhaust pipe 43L and the third exhaust pipe 44L are also fixed together by welding over the entire circumference of a connected portion thereof. A configuration and connection order of the right-side exhaust pipe 17R are similar to those of the left-side exhaust pipe 17L, and description thereof will be omitted.

Note that a part 47 attached onto the right-side exhaust pipe 17R is a bracket for attaching an unillustrated protector which covers the exhaust pipes. Fixing of the respective exhaust pipes to one another is performed by welding.

Reference numerals 49 and 49 are clamp members, each of which fixes the third exhaust pipe and the fourth exhaust pipe.

In the drawings, two of the catalysts 51 are placed in series in each exhaust pipe.

The catalysts 51 are placed in the exhaust pipe in a divided manner, and accordingly, each catalyst 51 can be miniaturized.

By miniaturizing each catalyst 51, the attaching structure of the catalysts 51 can be made easy and simple.

Note that, though the number of catalysts 51 placed in series is set at two in this embodiment, the number may be three or four, that is, the number may be set arbitrarily at two or more.

Figure 5:
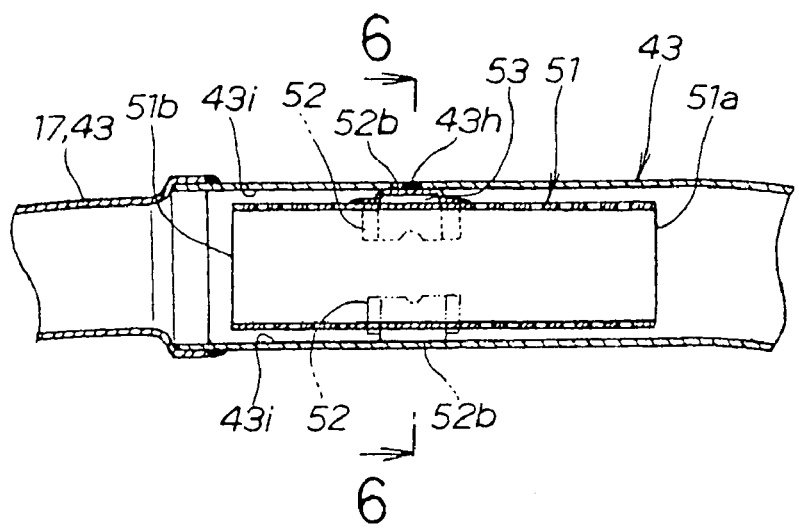
FIG. 5 is a cross-sectional view taken along a line 5-5 of FIG. 4.

FIG. 5 is a cross-sectional view taken along a line 5-5 of FIG. 4, showing that the catalysts 51 are fixed to the second exhaust pipe 43 by taking up one of the two catalysts 51 attached in series into the second exhaust pipe 43.

For fixing each catalyst 51 to the second exhaust pipe 43, both of them are attached together while interposing therebetween a pair of stay members 52 provided on an approximate center of the catalyst 51, and a front end 51a and rear end 51b of the catalyst 51 are made free, thus enabling thermal expansions thereof.

Note that the reason that a gap 53 is provided between the catalyst 51 and each stay member 52 is to facilitate contact of the exhaust gas to the catalyst 51 as much as possible.

After the catalyst 51 and the stay members 52 are attached together, the catalyst 51 is inserted into the second exhaust pipe 43, and fixed thereto by welding.

Details of the attachment of the catalyst 51 into the second exhaust pipe 43 will be described based on FIG. 6.

Figure 6:
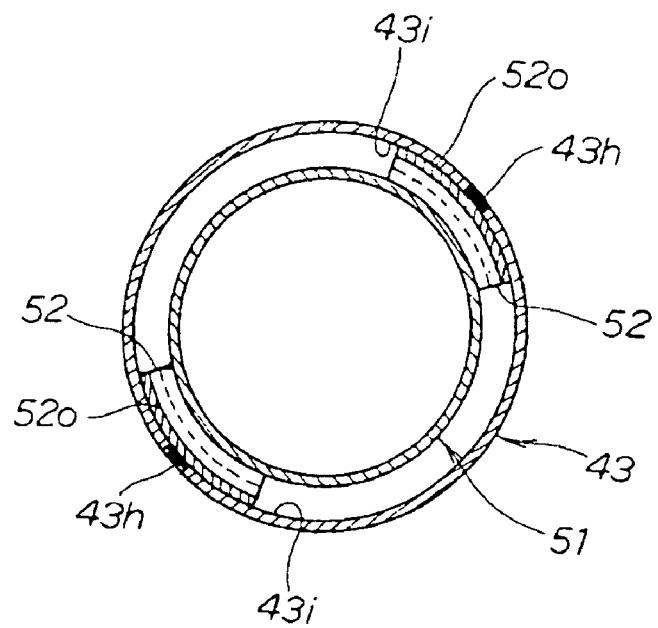
FIG. 6 is a cross-sectional view taken along a line 6-6 of FIG. 5.

FIG. 6 is a cross-sectional view taken along a line 6-6 of FIG. 5. It is shown that the catalyst 51 is fixed to the second exhaust pipe 43 in a manner that the two stay members 52 are attached onto the circumference of the cylindrical catalyst 51, outer surfaces 52b of the stay members 52 are fitted to an inner wall 43a of the second exhaust pipe 43, and are joined to catalyst-fixing holes 43h opened in predetermined spots of the second exhaust pipe 43 by plug welding.

The catalyst 51 is adapted to be attached into the second exhaust pipe 43 with the stay members 52 and 52 interposed therebetween, and accordingly, attachment work of the catalyst 51 can be performed easily.

In addition, each catalyst 51 can be miniaturized, and accordingly, a diameter of the second exhaust pipe 43 into which the catalysts 51 are attached can be decreased.

Returning to FIG. 5, with regard to the stay members 52 onto which each catalyst 51 is attached, a pair thereof is provided on two spots on the approximate center of the catalyst 51. As described above, each stay member 52 is fixed to one spot of the second exhaust pipe 43 by the plug welding by using the catalyst-fixing hole 43h. Moreover, each stay member 52 is fixed to two spots of the catalyst 51 by welding. Moreover, a gap is provided between the catalyst 51 and the second exhaust pipe 43, thus further enhancing function of the catalyst 51.

Specifically, the pair of stay members 52 and 52 onto which each catalyst 51 is attached is provided on the approximate center of the catalyst 51, and is provided so as to allow the front end 51a and rear end 51b of the catalyst 51 to be free, and to enable thermal expansion of the catalyst 51.

The pair of stay members 52 are provided on the approximate center of the catalyst 51, and are provided so as to set the front end 51a and rear end 51b of the catalyst 51 free, and to enable for thermal expansions thereof, and accordingly, the attaching structure of the catalysts 51 into the exhaust pipe 43 can be made to be simple.

Figure 7:
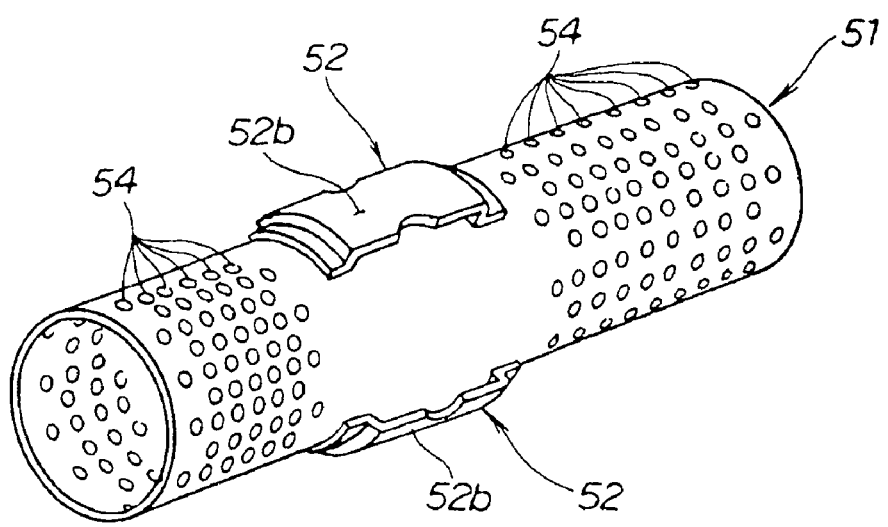
FIG. 7 is a perspective view of the catalyst according to the present invention.

FIG. 7 is a perspective view of the catalyst according to the present invention. The catalyst 51 is a cylindrical member, in which a large number of holes 54 . . . (" . . . " indicates a plurality. The same applies to the following.) with a predetermined diameter are opened in a metal member, and a material serving as the catalyst is coated on a surface thereof.

With regard to a manufacturing method, the catalyst 51 is manufactured in a manner that the large number of holes 54 . . . are opened on a surface of a planar metal member, the catalyst material is then adhered thereonto, and the metal member is formed into a cylindrical shape, and thereafter, sides thereof are butted and joined together by welding.

Then, the stay members 52 are joined to the approximate center of the outer circumferential surface thereof by welding and the like, and are fixed thereto.

Note that the diameter and number of the holes 54 . . . can be arbitrarily set.

Returning to FIG. 3, functions of the present invention will be described.

When a temperature difference between an ambiance of the second exhaust pipes 43L and 43R and the second exhaust pipes 43L and 43R is large, heat of the exhaust pipes warmed by the exhaust gas is in a state of being prone to be absorbed by the ambiance thereof.

However, the positions of the catalysts 51 placed in the exhaust pipes are placed near the side of the cylinder block 25, and the temperature difference between the ambiance of the exhaust pipes and the exhaust pipes can be reduced, and accordingly, heat radiation from the second exhaust pipes 43L and 43R which partially constitute the exhaust pipes 17 and include the catalysts 51 can be reduced.

Hence, immediately after the start of the engine, the temperatures of the catalysts 51 can be raised rapidly to the activation temperature.

In addition, the catalysts 51 are placed near the side of the cylinder block 25, and accordingly, heat insulating measures become unnecessary. Therefore, an increase of the number of parts can be restricted.

Moreover, size increase in the vehicle body 50, which may be caused by moving the front wheel 14 forward in order to avoid interfering with the catalysts 51, can be avoided.

The two exhaust pipes 17 extend from the engine 15, and the catalysts 51 are provided in the exhaust pipes 17L and 17R connected independently of each other to the left and right silencers 16L and 16R above the rear wheel 23. Accordingly, because the catalysts 51 are miniaturized, the catalysts 51 can be easily housed, even when the exhaust pipes 17 have many bent portions.

Note that, according to the first aspect of the invention, no problem may occur, even if the portions of the exhaust pipes on the side of the cylinder block are not placed within the overall width of the crankcase. Specifically, the portions may be placed out of the overall width of the crankcase.

Further, according to the second aspect of the invention, the catalysts may be placed in the respective exhaust pipes one by one.

In this embodiment, each catalyst is a cylindrical one provided with the large number of holes. However, the catalyst is not limited to this structure, and may be of a honeycomb corn type.

In addition, the catalysts may be used in combination with catalysts placed in other places by such as providing catalysts separately also on a silencer side.

Moreover, the two stay members are provided vertically on the two spots on the approximate center of each catalyst. However, besides this, for example, it is also possible to provide the stay members on two spots on a front end side and rear end side thereof, to fix one of the stay members, and not to fix the other so as to be slidable in a longitudinal direction of the cylinder in consideration of the thermal expansion of the catalyst.

Although the present invention is applied to the four-cycle single-cylinder engine including two exhaust ports in this embodiment, it is also possible to apply the present invention to a two-cylinder or a four-cylinder engine.

Moreover, no problem occurs even if the exhaust gas purifying apparatus of the present invention is not limited to application to the four-cycle engine, but is also applied to a two-cycle engine.

The exhaust gas purifying apparatus of the present invention is suitable for a motorcycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An exhaust gas purifying apparatus of a motorcycle comprising:
    an engine in which a cylinder block extends upwardly on a crankcase;
    an exhaust port provided on a front portion of the engine;
    an exhaust pipe extending forward of the engine from the exhaust port, then extending downward once, and thereafter, extending toward a rear of a vehicle body; and
    a catalyst placed in the exhaust pipe,
    wherein the exhaust pipe passes along a side of the cylinder block,
    wherein the exhaust pipe including a pair of exhaust pipes extending forward of the engine from the exhaust ports, then extending downward, and thereafter, extending upwardly and rearwardly toward the rear of the vehicle body; and
    wherein the catalyst is placed in the upwardly and rearwardly extending portion of each of the exhaust pipes in positions that overlap the side of the cylinder block,
    and when viewed in a plan view, the crankcase can be seen to extend further in a lateral direction of the motorcycle than an entirety of the portion of the exhaust pipe that passes along the side of the cylinder block.

2. The exhaust gas purifying apparatus of a motorcycle according to claim 1, wherein the two exhaust pipes extend from the engine, and
    wherein a portion of each of the two exhaust pipes passes along the side of the cylinder block, such that each of the two exhaust pipes is placed within an overall width of the crankcase, and
    wherein the side of the cylinder block is a right side of the cylinder block.

3. The exhaust gas purifying apparatus of a motorcycle according to claim 1, wherein the exhaust pipes include multiple exhaust pipe portions connected in series, and the catalysts are placed in one or more of the pipe portions passing along the side of the cylinder block.

4. The exhaust gas purifying apparatus of a motorcycle according to claim 1,
    wherein the entirety of the portion of the exhaust pipe on the side of the cylinder block is placed within an overall width of the crankcase.

5. The exhaust gas purifying apparatus of a motorcycle according to claim 1,
    wherein the exhaust pipe includes right and left exhaust pipes, the exhaust port includes right and left exhaust ports, and the catalyst includes at least two catalysts in each of the exhaust pipes;
    in positions that are located along the one side of the cylinder block, and
    wherein the right and left exhaust pipes extend forward of the engine from the respective right and left exhaust port and then pass along the side of the cylinder block, and
    wherein, at a position forward of the engine, the right exhaust pipe extends below the left exhaust pipe, and along the side of the cylinder block, the right exhaust pipe extends above the left exhaust pipe.

6. The exhaust gas purifying apparatus of a motorcycle according to claim 1, wherein the catalysts extend lengthwise a direction that is substantially orthogonal to an axis the cylinder block.

7. The exhaust gas purifying apparatus of a motorcycle according to claim 1, wherein the exhaust pipe includes right and left exhaust pipes which extending forward from the engine, pass along the one side of the engine, and then bend outwardly in order to be connected independently of each other to left and right silencers that are arranged above left and right sides of a rear wheel, wherein the right exhaust pipe is connected to the left silencer, and the left exhaust pipe is connected to the right silencer.

8. The exhaust gas purifying apparatus of a motorcycle according to claim 1, wherein at least two catalysts are placed in series in each of the exhaust pipes, and the catalysts are attached to the exhaust pipes with stay members interposed between each of the catalysts and the corresponding exhaust pipe.

9. The exhaust gas purifying apparatus of a motorcycle according to claim 8, further comprising a pair of the stay members which each of the catalysts is attached, the stay members being provided on an approximate center of each of the catalysts, and the catalysts each being provided so that a front end and rear end are each free.

10. The exhaust gas purifying apparatus of a motorcycle according to claim 8, wherein the exhaust pipes extend from the engine, and the catalysts are provided in the exhaust pipes connected independently of each other to left and right silencers above a rear wheel.

11. The exhaust gas purifying apparatus of a motorcycle according to claim 8, wherein a gap is provided between the catalysts and each of the stay members in order to facilitate contact of exhaust gas to the catalysts.

12. The exhaust gas purifying apparatus of a motorcycle according to claim 8, wherein each of the stay members is fixed to two spots in a lengthwise direction of the catalysts, and
    between the two spots in the lengthwise direction of the catalysts, a gap is provided in a radial direction between the catalysts and the stay members.

13. An exhaust gas purifying apparatus of a motorcycle comprising:
    an engine in which a cylinder block extends upwardly from a crankcase in a forwardly tilting direction;
    an exhaust port provided on a front portion of the engine;
    an exhaust pipe extending forward of the engine from the exhaust port, then extending downward once, and thereafter, extending toward a rear of a vehicle body; and
    a catalyst placed in the exhaust pipe,
    wherein a portion of the exhaust pipe passes along one side of the cylinder block in a direction which is substantially perpendicular to an axis of the cylinder block,
    wherein the catalyst is placed in the exhaust pipe in a position that overlaps the one side of the cylinder block when viewed in a side view, and
    wherein the catalyst includes at least two catalysts placed in series in a portion of the exhaust pipe that slopes upwardly in a direction toward a rear of the motorcycle,
    the catalysts being attached to the exhaust pipe with stay members interposed between each of the catalysts and the exhaust pipe,
    and when viewed in a plan view, the crankcase can be seen to extend further in a lateral direction of the motorcycle than an entirety of the portion of the exhaust pipe that passes along the one side of the cylinder block.

14. The exhaust gas purifying apparatus of a motorcycle according to claim 13, wherein the entirety of the portion of the exhaust pipe on the one side of the cylinder block is placed within an overall width of the crankcase.

15. The exhaust gas purifying apparatus of a motorcycle according to claim 13, wherein the two catalysts are placed in series,
the two catalysts being placed respectively on an upstream and a downstream side of a bent portion of the exhaust pipe.

16. The exhaust gas purifying apparatus of a motorcycle according to claim 13, wherein the stay members are provided on an approximate center of each of the two catalysts, and the catalysts being provided so that a front end and rear end of each the catalysts is free.

17. The exhaust gas purifying apparatus of a motorcycle according to claim 13, wherein the exhaust pipe includes right and left exhaust pipes extending from the engine, the right and left exhaust pipes pass along the one side of the engine, and then bend outwardly in order to be connected independently of each other to left and right silencers above a rear wheel, and
in a position forward with respect to the engine, the right exhaust pipe extends upwardly from below the left exhaust pipe so that the right exhaust pipe is above the left exhaust pipe as the exhaust pipes pass along the one side of the engine.

18. The exhaust gas purifying apparatus of a motorcycle according to claim 13, wherein the exhaust pipe includes multiple exhaust pipe portions connected in series, and the catalysts are placed in one or more of the pipe portions in a position such that the catalysts overlap the one side of the cylinder block.

19. The exhaust gas purifying apparatus of a motorcycle according to claim 13, wherein a gap is provided between the catalysts and each of the stay members in order to facilitate contact of exhaust gas to the catalysts.

20. The exhaust gas purifying apparatus of a motorcycle according to claim 13, wherein each of the stay members is fixed to two spots in a lengthwise direction of the catalysts, and
between the two spots in the lengthwise direction of the catalysts, a gap is provided in a radial direction between the catalysts and the stay members.

21. The exhaust gas purifying apparatus of a motorcycle according to claim 13, wherein the catalysts extend lengthwise a direction that is substantially orthogonal to the axis the cylinder block.

22. The exhaust gas purifying apparatus of a motorcycle according to claim 13, wherein the exhaust pipe includes right and left exhaust pipes which extend forward from the engine, then pass along the one side of the engine, and then bend outwardly in order to be connected independently of each other to left and right silencers that are arranged above left and right sides of a rear wheel, wherein the right exhaust pipe is connected to the left silencer, and the left exhaust pipe is connected to the right silencer.

23. An exhaust gas purifying apparatus of a motorcycle comprising:
an engine in which a cylinder block extends upwardly from a crankcase in a forwardly tilting direction;
an exhaust port provided on a front portion of the engine;
an exhaust pipe extending forward of the engine from the exhaust port, then extending downward once, and thereafter, extending toward a rear of a vehicle body; and
a catalyst placed in the exhaust pipe,
wherein a portion of the exhaust pipe passes along one side of the cylinder block in a direction which is substantially perpendicular to an axis of the cylinder block,
wherein the catalyst is placed in the exhaust pipe in a position that overlaps the one side of the cylinder block when viewed in a side view, and
when viewed in a plan view, the crankcase can be seen to extend further in a lateral direction of the motorcycle than an entirety of the portion of the exhaust pipe that passes along the one side of the cylinder block.

24. The exhaust gas purifying apparatus of a motorcycle according to claim 23, wherein the exhaust pipe includes a first and a second exhaust pipe, each of which extends forwardly from the engine, and
wherein a portion of each of the first and second exhaust pipes passes along the one side of the cylinder block, such that each of the two exhaust pipes is placed within an overall width of the crankcase, and
wherein, at a position forward of the engine, the first exhaust pipe extends below the second exhaust pipe, and along the one side of the cylinder block, the first exhaust pipe extends above the second exhaust pipe, and
wherein the side of the cylinder block is a right side of the cylinder block.

* * * * *